May 25, 1943.   F. W. DWYER   2,320,122
DRAFT GAUGE
Filed July 5, 1941
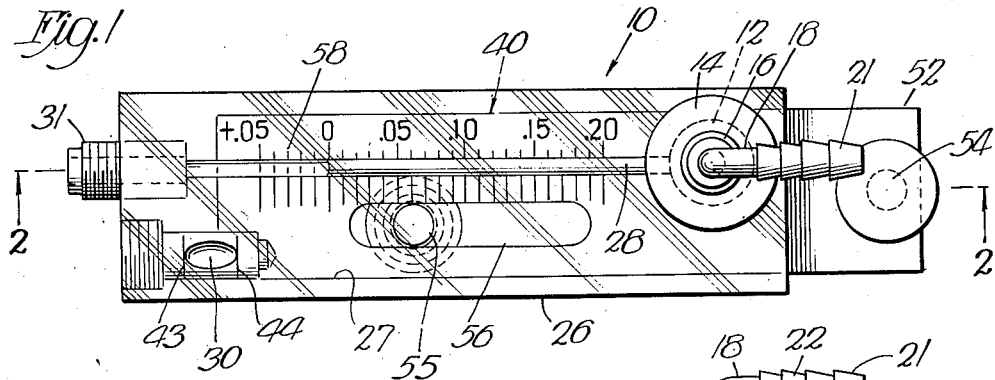
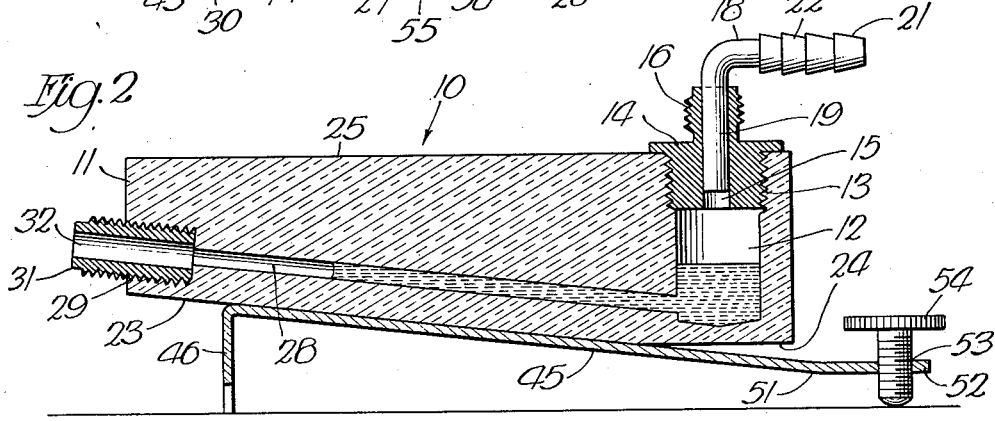
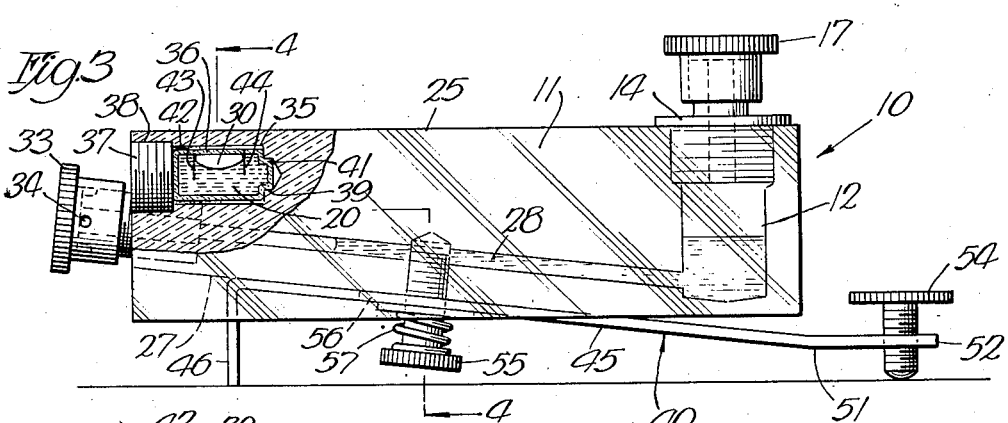
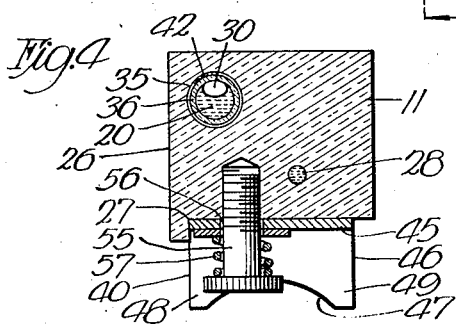
INVENTOR.
Frank W. Dwyer
BY Mann, Brown & Co[?]
ATTORNEYS.

Patented May 25, 1943

2,320,122

UNITED STATES PATENT OFFICE 2,320,122

DRAFT GAUGE

Frank W. Dwyer, Chicago, Ill.

Application July 5, 1941, Serial No. 401,091

7 Claims. (Cl. 73—31)

This invention relates to draft gauges and one of the principal objects of the invention is the provision of new and improved means for adjusting the gauge preparatory to taking readings therefrom.

Another object of the invention is the provision of a new and improved mechanism whereby micromatic adjustments of the gauge may be made whereby accuracy in the measurement of the draft may be assured and correct readings of the instrument obtained.

Another object of the invention is the provision of a new and improved draft gauge of transparent material having the scale so positioned that no portion of the same is obscured by the associated mechanism and shading of the scale is prevented, whereby readings may be made with ease and facility.

A further object of the invention is the provision of a draft gauge that is small and compact and one in which the adjustments may be made in a minimum of time and with a minimum of effort.

Another object of the invention is the provision of a new and improved draft gauge that is simple in construction, inexpensive to manufacture, effective in use and that may be adjusted and the readings taken with a minimum of time and effort.

Other and further objects and advantages of the invention will appear from the following description, taken in connection with the accompanying drawing in which—

Fig. 1 is a top plan view of the device;

Fig. 2 is a vertical section on the line 2—2 of Fig. 1;

Fig. 3 is a side elevation of the device, with parts broken away; and

Fig. 4 is a section on the broken line 4—4 of Fig. 3.

Draft gauges in common use are more or less large and cumbersome and have complicated mechanism not capable of accurate adjustment for leveling the same before readings can be taken. Furthermore, the scale is more or less obscured by the projecting parts of the mechanism and these parts, under any but the most favorable conditions, shade or cast shadows over the scale so that it is more or less difficult to read.

The present invention seeks to provide a gauge of minimum size that has a minimum of projecting parts and one in which accurate adjustments may be made whereby substantially accurate results may be had.

Referring now to the drawing, the reference character 10 designates the draft gauge which comprises a block or body portion 11 of transparent material, preferably some plastic material. The block 11 is provided with a reservoir 12 for an indicating liquid. The reservoir 12 is adapted to be internally threaded as at 13 and a plug 14 is adapted to close the upper end of the reservoir. This reservoir may be made by drilling a bore transversely into one end of the block 11, as shown more clearly in Fig. 2 of the drawing.

The plug 14, having an axial opening 15, is screw-threaded as at 16 on its outer surface for receiving a cap 17, Fig. 3, for closing the bore 15 when the device is not in use. A connector 18 is provided which has a downward extension 19 adapted to be inserted in the bore 15 when the device is to be used for indicating draft. The outer end of the connector 19 may, if desired, be bent, as shown at 21, and is corrugated or provided with notches 22 for holding a rubber tube or the like when the same is slipped over the end 21 of the connector. The rubber tube member, not shown, is of the usual type and its opposite end is provided with an apertured metal element which is adapted to be positioned within the draft for creating a partial vacuum in the reservoir 12, as is well understood in the art.

The lower surface of the block 11, for a considerable portion of its length and width, is rearwardly and upwardly inclined, as shown at 23 in Fig. 2. The portion 24 of the block beneath the receptacle 12 may be, and preferably is, parallel with the top surface 25 of the block 11. The block is rectangular in cross-section, as shown in Fig. 4, and one side 26 of the block 11, at what for convenience of description will be termed the outer end of the block, is extended downwardly below the inclined surface 23 to form a rabbet 27 for receiving the supporting member 40, as will presently appear.

The block 11 is provided with a small bore 28 which is in communication with the lower portion of the bore 12 and extends outwardly and upwardly and is in communication with an enlarged bore 29 in the outer end of the block 11. The enlarged bore 29 has a screw-threaded plug 31 inserted therein. The screw-threaded plug 31 has an axial opening 32 in alinement with the bore 28, Fig. 2. The enlarged bore 32 is closed by a cap 33 which engages the outer screw-threaded end of the plug 31, as shown more clearly in Fig. 3 of the drawing. The cap 33 may be provided with a transverse bore 34 whereby when the cap 33 is unscrewed a predetermined distance, the bore 28 will be in communication with the atmosphere.

The block 11 is provided with means for indicating a predetermined position of the same. As shown, a bore 35 is made in the outer end of the block adjacent one side thereof and a bubble; that is, a small glass receptacle 36 containing a liquid 20 with a bubble 30 therein, which functions as a level, is inserted in the opening and the opening is closed by a plug 37 engaging a screw-threaded counterbore 38. The receptacle 36 is mounted within the bore 35 in such a manner that the longitudinal axis of the receptacle 36 will be parallel with the upper face 25 of the block 11.

Suitable means are provided for positioning the receptacle 26 within the bore 35. As shown, the bore 35 has a small extension 39 at what will be termed its forward or inner end and the receptacle 36 has a complementary reduced portion 41 that makes a close fit in the bore extension 39. When the receptacle 36 is inserted, the reduced portion 41 engaging in the bore extension 39 will position the forward end of the receptacle and then the rear end of the receptacle 36 is secured in the proper position by the insertion of some filler material 42 such as litharge or the like, after which a plug 37 is inserted for holding the parts in proper position. The container 36 is provided with transverse lines 43 and 44 which are spaced apart a distance substantially equal to the length of the bubble so that when the bubble is between the lines, the block will be in a level position.

Suitable means are provided for adjustably supporting the block 11 in such a manner that the same may be tilted to a limited extent in order to level the same. As shown, the support 40 comprises a plate 45 having its outer end 46 turned downwardly and having a cut-out portion 47 to form arms 48 and 49, Fig. 4, for supporting the outer end of the block 25. The plate 45 inclines downwardly to a point 51 adjacent its inner end 52 and this end is bent so that it is parallel with the upper face 25 of the block for receiving a vertical screw-threaded opening 53 through its central portion. A set screw 54 is threaded in the opening and is adapted to support the inner end of the plate 45 and with it the block 11. It will readily be seen that with the aid of the set screw 54, the block may be tilted to bring the bubble 30 between the lines 43 and 44. By means of this set screw, micromatic adjustments may be obtained. The plate 45 is graduated on its upper surface to indicate pressures. These graduations may be read through the block.

The block 25 is slidably connected to the plate 45 so that when the body rests on the support and the screw 54 has been adjusted to bring the bubble to the right position, the outer end of the indicating liquid column may be brought to zero on the scale by sliding the body along the supporting plate 45.

Suitable means are provided for connecting the plate to the block. In the form of the construction shown, the bottom face of the block is screw-threaded and a set screw 55 extends through a slot 56 in the plate and engages the screw-threaded opening. A spring 57 is inserted between the plate and the head of the screw 55 so as to cause the plate 45 to frictionally engage the inclined surface 23 of the block so as to frictionally hold the block in adjusted position. The inclination of the outer end of the plate 45 is the same as the inclined surface of the outer end of the bottom wall of the block so that the block may be slid along the inclined face of the support 45 without disturbing the bubble 30.

The bore 28 is at one side of the longitudinal axis of the block and the set screw 55 is at the opposite side thereof so that the screw will not interfere with the reading of the scale which is made on the top face of the plate as shown at 58. In using the device, the gauge is placed in position on a convenient support, the cap 17 removed and the cap 33 released to place the bore in communication with the atmosphere. The instrument is adjusted by means of the screw 54 until the bubble is between the lines after which the block 25 is slid along the support 45 to bring the end of the liquid column to zero on the scale after which the connector and associated parts may be attached, the exposure made and the readings taken. The above steps may be taken without regard to sequence except that in adjusting the end of the indicating liquid column to zero on the scale, both ends of the liquid column must be exposed to normal atmospheric pressure by removing the cap 17 and loosening the cap 33.

It is thought from the foregoing, taken in connection with the accompanying drawing, that the construction and operation of my device will be apparent to those skilled in the art and that changes in size, shape, proportion and detail may be made without departing from the spirit and scope of the appended claims.

I claim as my invention:

1. In a draft gauge, a body portion of transparent material, a level device incorporated in said body portion, a reservoir in said body portion adjacent one end thereof for containing a liquid, a liquid column bore inclined to the horizontal extending along said block in communication with the lower part of said reservoir, a support upon which the body portion rests, said support comprising an elongated plate having one end bent to form a supporting leg, means for adjusting the height of the other end of said plate for leveling said body portion, calibrations on the upper surface of said support, and means for adjusting said body portion along said support for bringing the end of the liquid column in said bore to zero on said calibrations.

2. A draft gauge comprising a transparent body portion having a reservoir in one end portion thereof for containing an indicating liquid, a small bore extending upwardly and outwardly from said reservoir for receiving said liquid therein, a support for said body, a level carried by said body, means for vertically adjusting one end of said support for leveling the same to bring the bubble of said level to central position, a graduated scale carried by said support, means for slidably mounting said body on said support whereby the meniscus of liquid within said bore may be brought to zero on said scale by moving said body along said support.

3. A draft gauge comprising a transparent body portion having a transverse bore forming a reservoir in one end portion thereof for containing an indicating liquid, a small bore extending upwardly and outwardly from said reservoir for receiving said liquid therein, a support for said body, a level inserted in a bore in said body, an adjusting supporting member screw-threaded into one end portion of said support and extending below the same for raising and lowering the corresponding end of said support for adjusting the bubble in said level to central position, the upper surface of said support having graduations thereon, and means for relatively adjusting said body along said support to bring the meniscus of the liquid in said bore to zero on said scale.

4. A draft gauge comprising a body portion of transparent material having a reservoir in its inner end thereof opening upwardly, a bore extending upwardly and outwardly from said reservoir to the outer end of said body, a level located in a recess within the outer end of said body, a support for said body, adjustable means for vertically adjusting one end of said support for leveling said body, a scale beneath said body portion and visible from a point thereabove, said reservoir and bore being on one side of said scale and said recess on the other whereby the same do not interfere with reading said scale through said body from above the same.

5. In a draft gauge, a body portion of transparent material, said body portion having a reservoir for an indicating liquid opening upwardly from the end of said body portion, a bore extending upwardly and toward the opposite end of said body portion from said reservoir, means for supporting and leveling said body portion, and a graduated scale on said means, said scale facing upwardly beneath said body portion whereby the same may be viewed from a point above said body portion.

6. In a draft gauge comprising a body portion of transparent material having a plane upper face and provided with a reservoir in one end thereof opening upwardly, a bore extending upwardly and toward the end opposite from said reservoir, said body portion having the end opposite said reservoir provided with a bore therein having a coaxial extension of smaller diameter, a bubble member within said bore and having an axial projection of reduced diameter fitting snugly within the extension of said bore, means for positioning the larger portion of said bubble member within the enlarged portion of said bore with its axis parallel with the face of said body member, and means for vertically adjusting one end of said body portion for leveling said bubble member.

7. In a draft gauge, a body portion of transparent material having a flat upper surface, said body portion having a reservoir opening upwardly for containing an indicating liquid, a plug having an axial bore threaded into said reservoir, means for closing said bore, a small bore extending upwardly and outwardly lengthwise of said body portion toward the end opposite said reservoir, said last-named bore being in communication with said reservoir, means for closing the outer end of said last-named bore, said body portion having its lower surface rabbeted with the major portion thereof in a plane parallel with said last-named bore, a support engaging in said rabbet, means for vertically adjusting one end of said support to level said body portion, a level device associated with said body portion for indicating a horizontal position of the longitudinal axis of said body portion, a graduated scale between said body portion and support readable through said body portion from above, and means for adjusting said body portion along said support to bring the meniscus of the liquid in said last-named bore to zero on said scale, the lower surface of said body portion that engages the upper surface of said support being parallel with said last-named bore whereby moving said body along said support will not disturb the horizontal position of said level device.

FRANK W. DWYER.